United States Patent
Eastwood et al.

(10) Patent No.: US 7,876,740 B2
(45) Date of Patent: Jan. 25, 2011

(54) METHOD AND SYSTEM FOR SYNCHRONIZATION OF LINK LAYER WINDOWS

(75) Inventors: James E. Eastwood, Bellingham, WA (US); Jeff S. Anderson, Itasca, IL (US); Roberto A. Perez, Miramar, FL (US)

(73) Assignee: Motorola, Inc., Schaumburg, IL (US)

( * ) Notice: Subject to any disclaimer, the term of this patent is extended or adjusted under 35 U.S.C. 154(b) by 907 days.

(21) Appl. No.: 11/196,931

(22) Filed: Aug. 4, 2005

(65) Prior Publication Data
US 2007/0030864 A1 Feb. 8, 2007

(51) Int. Cl.
*H04J 3/06* (2006.01)
*H04J 3/12* (2006.01)
*H04B 7/00* (2006.01)

(52) U.S. Cl. ............ 370/350; 370/503; 370/522; 455/502

(58) Field of Classification Search ......... 370/350, 370/503, 509, 522; 713/400; 375/354
See application file for complete search history.

(56) References Cited

U.S. PATENT DOCUMENTS

| | | | |
|---|---|---|---|
| 6,301,249 B1 * | 10/2001 | Mansfield et al. | 370/394 |
| 6,335,933 B1 * | 1/2002 | Mallory | 370/394 |
| 6,671,288 B1 | 12/2003 | Onodera | |
| 7,356,750 B2 * | 4/2008 | Fukushima et al. | 714/748 |
| 2001/0046240 A1 | 11/2001 | Longoni et al. | |
| 2002/0066012 A1 | 5/2002 | Relander et al. | |
| 2003/0043744 A1 * | 3/2003 | Lu et al. | 370/236 |
| 2003/0074629 A1 | 4/2003 | Levin | |
| 2003/0152094 A1 * | 8/2003 | Colavito et al. | 370/412 |
| 2004/0114468 A1 | 6/2004 | Piirainen | |
| 2005/0265256 A1 * | 12/2005 | Delaney | 370/254 |

(Continued)

FOREIGN PATENT DOCUMENTS

EP 0310360 B1 2/1995

(Continued)

OTHER PUBLICATIONS

ETS (European Telecommunication Standard); Draft; pr ETS 300 392-2; Feb. 2000; Terrestrial Trunked Radio (Tetra); Voice Plus Data (V+D); Part 2: Air Interface (AI); Chapter 22, pp. 446-487.

(Continued)

*Primary Examiner*—Warner Wong
(74) *Attorney, Agent, or Firm*—Indira Saladi; Terri S. Hughes; Valerie M. Davis (57) ABSTRACT

A method and system for synchronization of link layer windows in a wireless communications system is disclosed. At a transmitter in the wireless communications system, the transmitter transmits a plurality of frames in a transmitter's link layer window, wherein each frame comprises segments and sends a request for an acknowledgement of the plurality of frames to a receiver. Then the transmitter determines a last transmitted segment of an eldest frame of the plurality of frames in the transmitter's link layer window, if a response to the request is not received within a specified time period and sets a synchronization indicator in the determined last transmitted segment of the eldest frame. Finally, the transmitter transmits the determined last transmitted segment of the eldest frame with the synchronization indicator set to the receiver.

20 Claims, 4 Drawing Sheets

U.S. PATENT DOCUMENTS

| | | | |
|---|---|---|---|
| 2006/0002428 A1* | 1/2006 | Trainin | 370/503 |
| 2006/0133554 A1* | 6/2006 | Horn | 375/354 |
| 2006/0262718 A1* | 11/2006 | Li et al. | 370/229 |
| 2007/0019591 A1* | 1/2007 | Chou et al. | 370/337 |

FOREIGN PATENT DOCUMENTS

| | | | |
|---|---|---|---|
| WO | WO0137473 A1 | | 5/2001 |
| WO | WO2004086797 A1 | | 10/2004 |
| WO | WO 2005/027456 | * | 3/2005 |

OTHER PUBLICATIONS

3GPP TS 44.064 V7.2.0 Technical Specification; 3rd Generation Partnership Project; Techinical Specification Group Core Network; Mobile Station-Serving GPRS Support Node (MS-SGSN); Logical Link Control (LLC) Layer Specification; Release 7; Sep. 2007; 63 Pages.

* cited by examiner

METHOD AND SYSTEM FOR SYNCHRONIZATION OF LINK LAYER WINDOWS

FIELD OF THE INVENTION

The present invention relates generally to wireless communications systems and more specifically to synchronization of a link layer window.

BACKGROUND OF THE INVENTION

In a wireless communications system, frames are sent over a wireless link so that a transmitter and a receiver can communicate. In such a system, each transmitter and each receiver implements a link layer window that keeps track of the frames sent and received between the two devices. The link layer window has knowledge of which frames are sent and which frames have been acknowledged as having been received. For example, if a transmitter has sent frames 1 2 3 then the link layer window at the transmitter has knowledge that it has sent frames 1 2 3. If the receiver has received frames 1 2 3, then the link layer window at the receiver has knowledge that frames 1 2 3 have been sent by the transmitter.

If all the frames that are sent are acknowledged, then the link between the receiver and transmitter is considered to be in synchronization. However, if the knowledge of frames sent (also termed the transmitter's link layer window) is different than the knowledge of frames received (also termed the receiver's link layer window), then the link layer windows of the receiver and transmitter are considered to be out of synchronization. For example, if a transmitter sends frames 1 2 3 (e.g. the transmitter's link layer window), but the receiver receives frame 2 (the receiver's link layer window) without receiving frame 1, the receiver has knowledge that the link layer windows are out of synchronization.

If the link layer windows become out of synchronization, the link layer windows at the receiver and transmitter need to be reset. Resetting the link layer windows requires the receiver to clear its link layer window, e.g. clear the link layer window of frame 2, and requires the receiver to send an over-the-air message that informs the transmitter that the receiver is not in synchronization with the transmitter. Upon the transmitter receiving the message, the transmitter clears the transmitter's link layer window and retransmits the frames that were in the transmitter's link layer window, e.g. frames 1 2 3 (also termed "in flight" frames).

Thus, resetting link layer windows between a receiver and transmitter requires actions such as having to perform additional over-the-air signaling, having to flush link layer windows, and having to retransmit frames. Such actions are inefficient to providing efficient communications between the transmitter and receiver. Accordingly, there is a need for improved synchronization of link layer windows.

BRIEF DESCRIPTION OF THE FIGURES

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments of the present invention, it should be observed that the present invention resides primarily in combinations of method steps and apparatus components. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
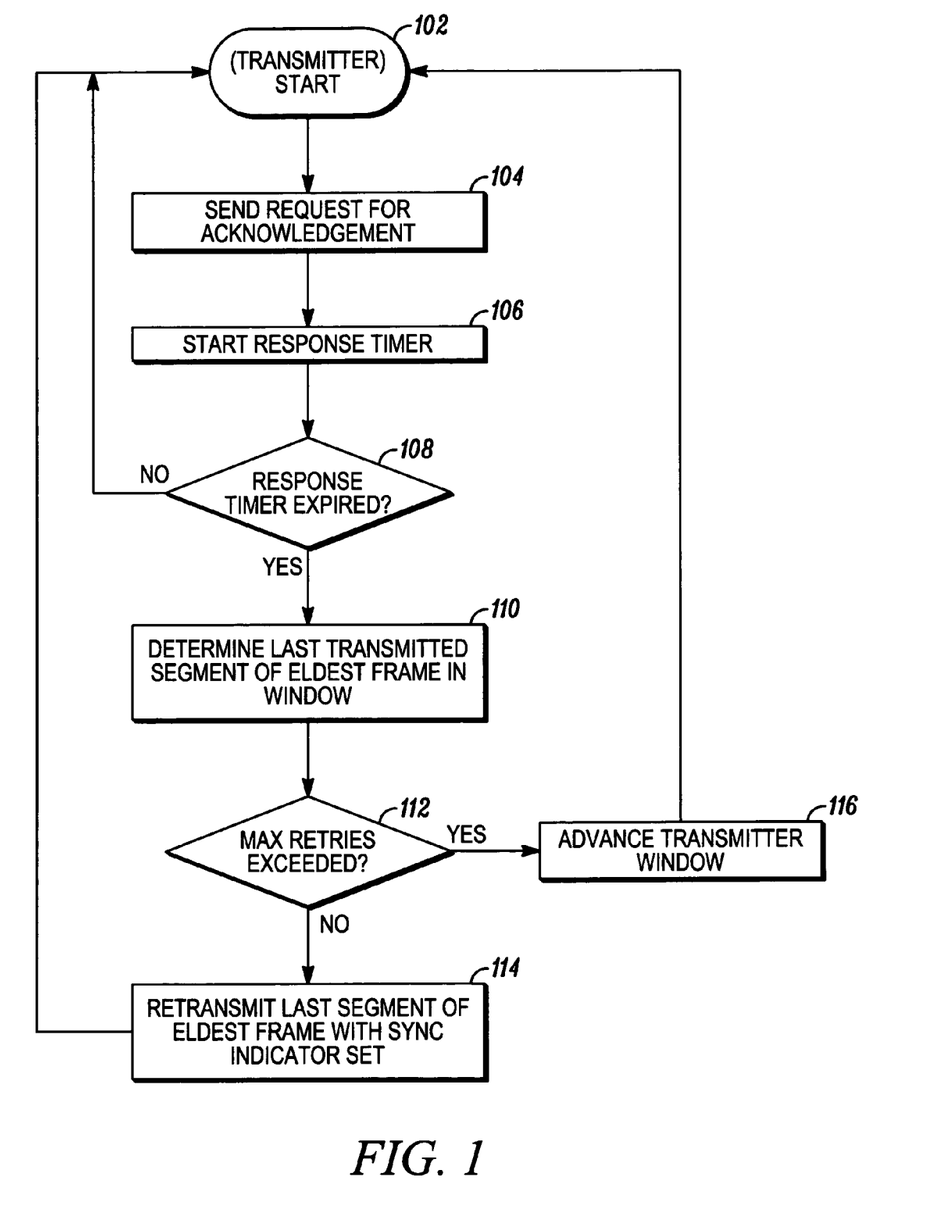
FIG. 1 is a flow diagram of an example transmitter in accordance with an embodiment of the invention.
Figure 2:
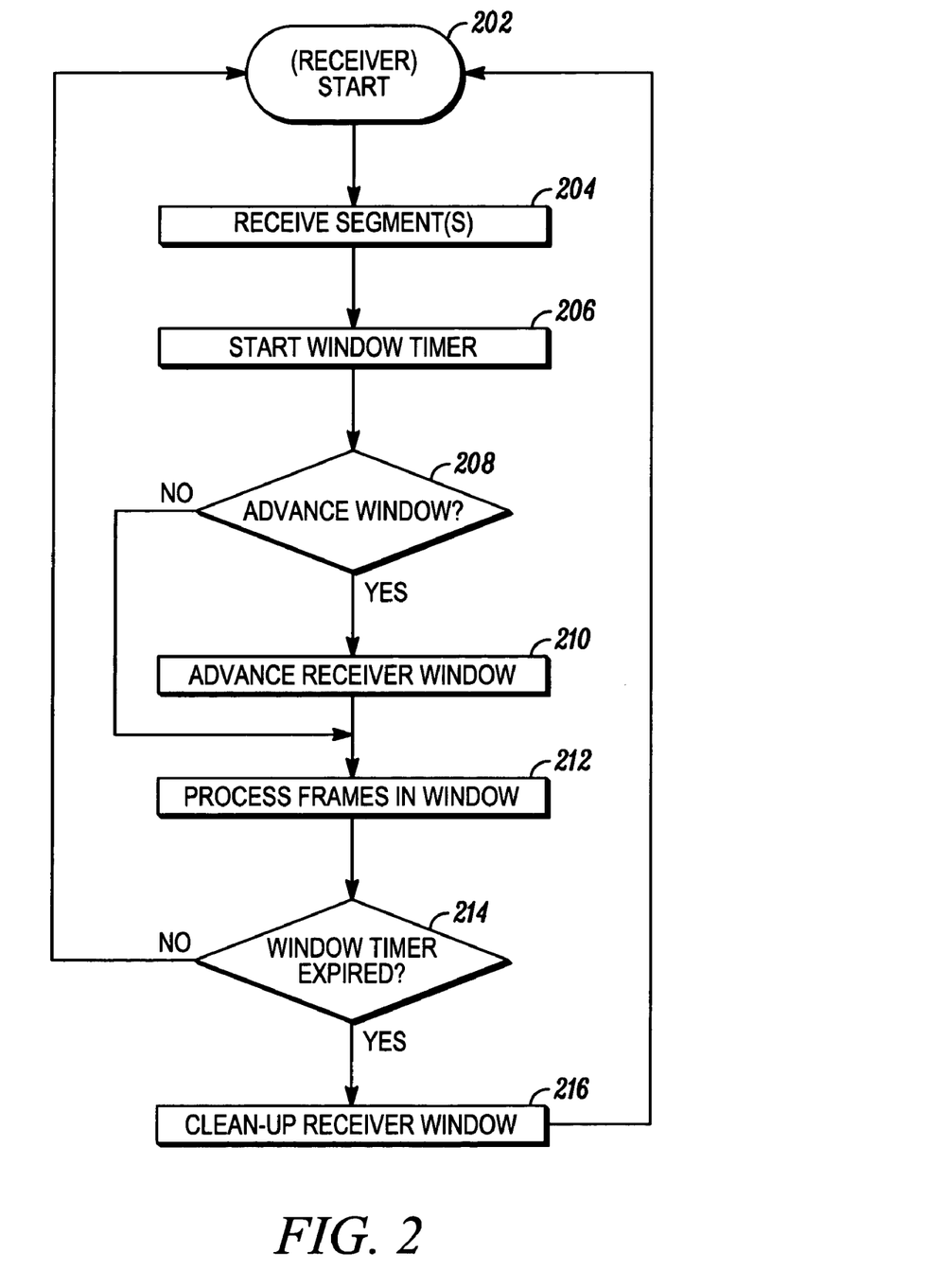
FIG. 2 is a flow diagram of an example receiver in accordance with an embodiment of the invention.
Figure 2A:
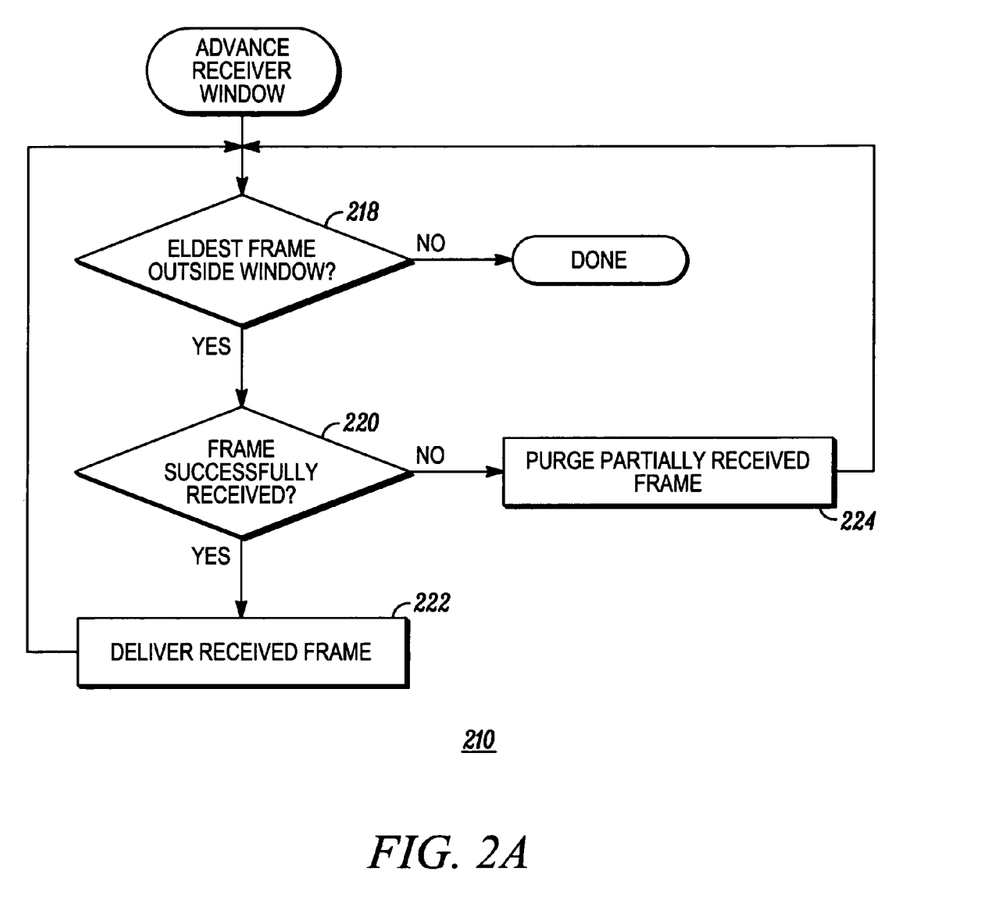
Figure 2B:
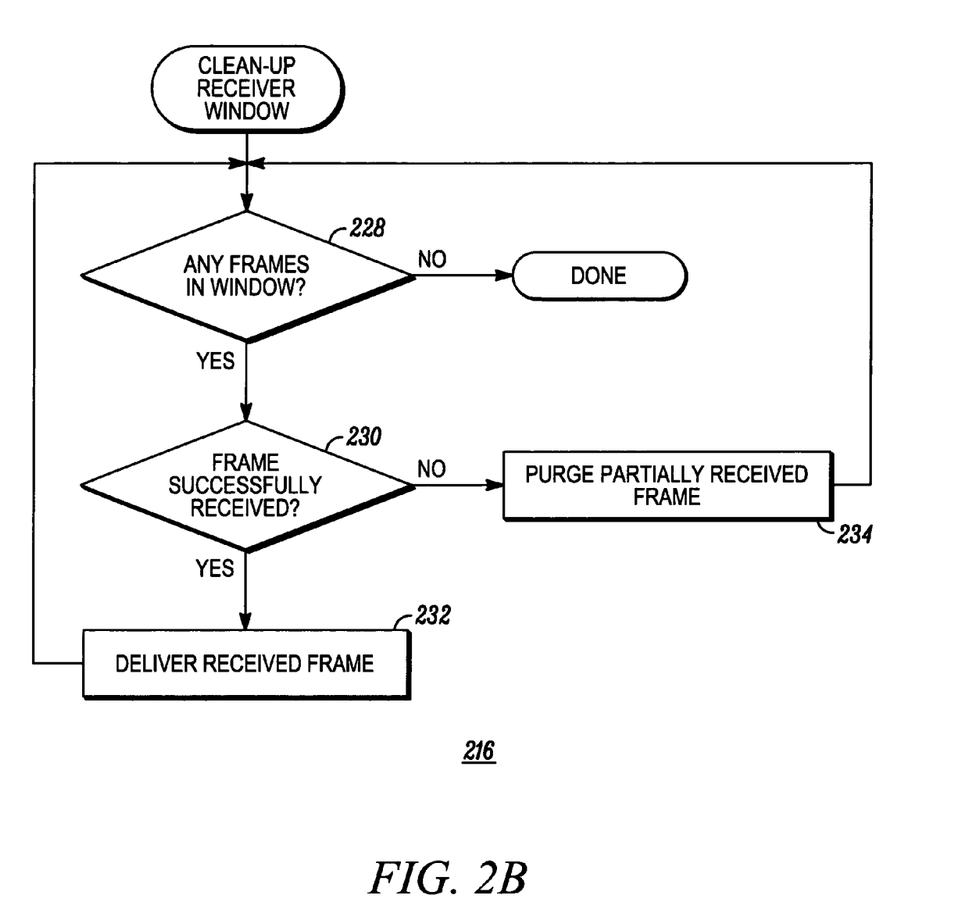

Referring to FIGS. 1 and 2, shown are flow diagrams for an example transmitter and an example receiver, respectively, in accordance with embodiments of the present invention. As used herein, the transmitter is any such device that performs the function of sending wireless communications over a radio frequency (RF) air interface. As used herein, the receiver is any such device that performs the function of receiving wireless communications over the RF air interface. In one embodiment, the protocol used to send and receive frames for communications between the transmitter and receiver is described in a standards document for Telecommunications Industry Association (TIA) 902 Wideband Air Interface (WAI) Link Layer Control.

As used herein, the example transmitter and receiver are contemplated to work in a wireless communications system, e.g. but not limited to Code Division Multiple Access (CDMA), Time Division Multiple Access (TDMA), Frequency Division Multiple Access (FDMA), and the like. Moreover, an embodiment of the present invention may be used in any currently available radio network, such as, for example, Global System for Mobile communication (GSM), General Packet Radio Service (GPRS), Universal Mobile Telecommunications Service (UMTS), Trans-European Trunked Radio service (TETRA), Association of Public Safety Communication Officers (APCO) Project 25, Personal Communication Service (PCS), Advanced Mobile Phone Service (AMPS) and the like. In the alternative, other wireless technologies, such as those now known or later to be developed and including, but not limited to, infrared, Bluetooth, electric field, electromagnetic, or electrostatic transmissions, may likewise suffice.

In operation, the transmitter sends frames to the receiver (Block 102). Specifically, the transmitter decomposes each frame into constituent segments where a segment is sent as a protocol data unit (PDU) over the air to a receiver. For example, the transmitter sends frame 1 decomposed into three segments (as described herein, segments 1a 1b 1c) which are sent as PDUs. Then, the transmitter continues by sending additional frames which are also decomposed into segments. For example, frame 2 may comprise segments a b c d (as described herein, segments 2a 2b 2c 2d). Upon sending a specified number of frames, the transmitter sends a request for an acknowledgement from the receiver (Block 104). In one embodiment, the transmitter sends the number of frames that relates to a size of a window before requesting an acknowledgment from the receiver. For example, if the window size is 5 frames, then the transmitter sends 1 to 5 frames before requesting the acknowledgement from the receiver. In one embodiment, the window size is specified by TIA 902.

The transmitter requires the acknowledgement so that it can confirm that the receiver has received the specified number of frames. For example, if the transmitter has sent frames 1 2 as segments 1a 1b 1c 2a 2b 2c 2d, then the transmitter requests that the receiver acknowledge that it has received frames 1 2 as segments 1a 1b 1c 2a 2b 2c 2d. If the receiver has received all the segments associated with frames 1 2, then the receiver has to send an acknowledgment acknowledging all the segments. If the receiver has not received all the segments associated with frames 1 2, then the receiver can send an acknowledgement specifying which segments of the frames 1 2 that it has received. For example, if the receiver has received segments 1a 1b 2a 2b 2c, then the receiver can send an acknowledgement specifying that it has received segments 1a 1b and the receiver can send another acknowledgement specifying that it has received segments 2a 2b 2c. Otherwise, if the receiver has not received all the segments associated with frames 1 2, then the receiver can send an acknowledgement specifying which segments of the frames 1 2 that it has not received. For example, if the receiver has received segments 1a 1b 2a 2b 2c, then the receiver can send an acknowledgement specifying that it has not received segment 1c and the receiver can send another acknowledgment specifying that it has not received segment 2d. As known in the art, implementing acknowledgement procedures between a receiver and transmitter can be performed in a number of ways and will not further be described herein.

In any case, in one embodiment, the request for acknowledgement that the transmitter sends is not a separate message but is a flag that is set when the transmitter sends the last segment of the last frame of the transmitter's link layer window. For example, when the transmitter sends segment 2d, it sets a flag that requires the receiver to acknowledge that it has received frames 1 2 and segments associated with frames 1 2. In another embodiment, the request for acknowledgement that the transmitter sends is sent before the transmitter sends the last segment of the last frame of the transmitter's link layer window. Referring to the previous example, when the transmitter sends segment 1b, it sets a flag requesting the receiver acknowledge that it has received frame 1, but the transmitter does not wait for the received acknowledgment from the receiver but continues to send frames to the receiver until the transmitter has sent the last segment of the last frame of the transmitter's link layer window.

In one embodiment, the number of frames that the transmitter requires an acknowledgment for, the window size, the protocol for sending and receiving frames, and other details relating to the link layer are well known. Further, TIA 902 details such specifications and in one embodiment, the details relating to the link layer are described by TIA 902. In any case, the link layer details are not further described herein.

Upon the transmitter sending the request for an acknowledgement from the receiver (Block 104), the transmitter starts a response timer (Block 106). If the transmitter receives an acknowledgement from the receiver before the response timer expires (Block 108), then the transmitter resumes sending frames to the receiver (Block 102). However, if the transmitter does not receive an acknowledgment from the receiver before the response timer expires (Block 108), then the transmitter determines the last transmitted segment of the eldest frame that it transmitted to the receiver (Block 110). For example, if the transmitter transmitted segments 1a 1b 1c 2a 2b 2c 2d in consecutive order (thus, the link layer window comprises frames 1 2, then the transmitter determines that the eldest frame is frame 1 and the last transmitted segment of the eldest frame is segment 1c. As used herein, eldest frame means the frame in the link layer window that was transmitted at the earliest time, meaning that the frame was transmitted at a time prior to the other frames in the link layer window. As used herein, the last transmitted segment means the segment that was transmitted at the latest time, meaning that the segment was transmitted at a time subsequent to the other segments.

In one embodiment, determining the last transmitted segment of the eldest frame (Block 110) comprises determining the frames in flight. For example, if frames 1 2 have been transmitted to the receiver and the transmitter has asked for an acknowledgement for frames 1 2 for which the transmitter has not received an acknowledgment, then the frame 1 2 are considered to be in flight. Next, the transmitter selects the eldest of the frames in flight. For example, if frames 1 2 are in flight, then frame 1 is considered to be eldest since it was transmitted before frame 2. Next, the transmitter chooses the last transmitted segment of the selected eldest frame in flight. For example, segment 1c. In yet another example, if the receiver has received segments 1a 1b 2a 2b 2c, then the receiver can send an acknowledgement specifying that it has not received segments 1c 2d. In such a situation, the transmitter retransmits only segments 1c 2d to which the transmitter has knowledge that the segments 1c 2d are in flight. In such a situation, 1c is determined to be the last transmitted segment of the eldest frame in the window.

Having determined the last transmitted segment of the eldest frame in the window, the transmitter checks to see if the maximum number of retries has been exceeded (Block 112). In one embodiment, the maximum number of retries is a negotiated parameter. If the maximum number of retries has not been exceeded (Block 112), then the transmitter retransmits the last segment of the eldest frame and in the retransmission the transmitter sets a synchronization indicator in the last segment of the eldest frame (Block 114) so that when the receiver receives the retransmitted last segment of the eldest frame, the receiver has knowledge that the link layer windows may be out of synchronization. In one embodiment, the synchronization indicator is a flag (e.g. a bit) that is set when the segment is transmitted to the receiver. For example, setting an Acknowledgment Requested (AR) field of the PDU is an implementation of setting the synchronization indicator. Continuing with the above example, segment 1c is retransmitted with the synchronization indicator set to indicate that the link layer windows may be out of synchronization.

In one embodiment, setting a synchronization indicator when retransmitting the last segment of eldest frame provides knowledge to the receiver of the transmitter's link layer window. By having knowledge of the transmitter's link layer window, the receiver can adjust its link layer window to match the transmitter's link layer window. Continuing with the above example, when the receiver receives the retransmitted segment 1c with the synchronization indicator set, the receiver ensures that its link layer window contains frame 1 and newer frames. As such, the synchronization indicator informs the receiver of where the beginning of the link layer window is. If the receiver has segments that are older than the determined last transmitted segment of the eldest frame, then the receiver can automatically advance its link layer window without having to reset the link. Automatically advancing the receiver's link layer window is described below with reference to FIG. 2. In any case, the receiver and transmitter maintain synchronization of link layer windows.

If the maximum number of retries has been exceeded (Block 112), then the transmitter advances the transmitter window (Block 116). Where the transmitter has given up on communicating a frame in the current link layer window as evidenced by the number of retries having been exceeded (Block 112), the transmitter advances the transmitter's link layer window. As described below, when the receiver receives segments for frames that are outside the current window, the receiver similarly advances the receiver's link layer window. As such, the receiver and transmitter maintain synchronization of link layer windows.

In operation, the receiver functions as a receiver (Block 202) and receives frames in the form of segments from the transmitter (Block 204). Upon receiving a segment from the transmitter, the receiver starts a window timer (Block 206). If the received segment requires the receiver advance the receiver's link layer window, then the receiver performs advance receiver window (Block 210) processing. In one embodiment, the receiver advances the receiver's link layer window when at least one of the following occurs: a) the receiver receives a segment that is not within the receiver's link layer window and b) the receiver receives a segment with the synchronization indicator set. In any case, the receiver advances the receiver's link layer window when the receiver receives indication that the receiver and transmitter's link layer windows may be out of synchronization.

However, if the received segment does not require the receiver to advance the receiver's link layer window, then the receiver processes the received segment (Block 212). In one embodiment, processing the received segment means to a) hold segments until a frame is complete and b) deliver frames in consecutive order to a higher layer (e.g. network layer) of the receiver. For example, if frames 1 2 have been received by the receiver as segments 1a 1b 1c 2a 2b 2c 2d, then frame 1 is delivered to a higher layer when segments 1a 1b 1c have been received. Further, frame 2 is not delivered to a higher layer until frame 1 has been delivered and segments 2a 2b 2c 2d are received. Thus, frames are delivered in consecutive order.

If the received segment is not within the receiver's link layer window, then the receiver advances its link layer window (Block 210). In one embodiment, determining that the received segment is not within the receiver's link layer window depends upon the size of the receiver's link layer window and frame number of the received segment. In one embodiment, the receiver determines that the received segment is not within the receiver's link layer window by determining a window size for the receiver's link layer window, calculating a largest frame number for the window size based upon a frame with the lowest frame number in the receiver's link layer window, and comparing the frame number of the received segment with the largest frame number. If the frame number of the received segment is greater than the largest frame number, then the received segment is not within the receiver's link layer window. For example, if the window size is 5 and the receiver receives segment 6a when the receiver's link layer window contains frame 1, then the receiver determines that the received segment is not within the receiver's link layer window because the received segment 6a is greater than the window size for a receiver's link layer window having frame 1. When the receiver determines that the received segment is not within the receiver's link layer window, the receiver advances the receiver's link layer window where advancing the receiver's link layer window means to determine the eldest frame in the receiver's link layer window and determine whether the eldest frame is within the current receiver's link layer window (Block 218). As used herein, eldest frame means the frame in the link layer window that was received at the receiver with the lowest sequence number. In one embodiment, the sequence number is a logical number that is implemented using a modulo counter. For example, sequence number 0 may be higher than sequence number 7 for a modulo 8 counter.

If the eldest frame in the receiver's link layer window is not outside the current receiver's link layer window, then the receiver processes the received segment (Block 212). If the eldest frame is outside the receiver's link layer window, then the receiver determines whether the eldest frame is successfully received (Block 220) wherein successfully received means that segments associated with the frame are available in the receiver's link layer window so that the frame is complete. If the frame is successfully received, the receiver delivers the complete frame to a higher layer (Block 222); otherwise, the receiver purges the partially received frame by removing the segments that are associated with the partially received frame (Block 224). In one embodiment, purging the partially received frame is performed because the receiver assumes that the transmitter has given up on sending the partially received frame. Thus, purging the partially received frame is performed to make room for the newly received frame and to align the receiver's link layer window with the transmitter's link layer window. In any case, as long as the window timer has not expired (Block 214), the receiver continues to receive segments (Block 212).

If the window timer has expired (Block 214), then the receiver performs clean up of the receiver's link layer window (Block 216). Under normal operation, the window timer should not expire. The window timer expiring means that the transmitter is not sending any segments to the receiver. This may occur, for example, if the transmitter has given up on sending elder frames. However, the window timer ensures that successfully received frames are delivered to a higher layer instead of being purged as in the prior art.

In one embodiment, upon expiration of the window timer, if the receiver has any frames in the receiver's link layer window (Block 228), then the receiver determines whether there are any complete frames to be delivered (Block 230). If there are complete frames, the receiver delivers the complete frame to a higher layer (Block 232); otherwise, the receiver purges the partially received frame by removing the segments that are associated with the partially received frame (Block 224). In any case, after clean-up, the receiver's link layer window is void of any received segments for any frames. After performing clean-up, the receiver returns to functioning as a receiver waiting for segments to be sent by the transmitter (Block 202).

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for synchronization of link layer windows in a wireless communications system comprising a receiver and a transmitter, the method comprising: at a transmitter in the wireless communications system:
   transmitting a plurality of frames in a transmitter's link layer window, wherein each frame comprises segments;
   sending a request for an acknowledgement of the plurality of frames to a receiver;
   determining a last transmitted segment of an eldest frame of the plurality of frames in the transmitter's link layer window, if a response to the request is not received within a specified time period;
   setting a synchronization indicator in the determined last transmitted segment of the eldest frame; and
   transmitting the determined last transmitted segment of the eldest frame with the synchronization indicator set to the receiver.

2. The method of claim 1 wherein the transmitter's link layer window is advanced if a maximum number of retries has been exceeded in transmitting the determined last transmitted segment of the eldest frame to the receiver.

3. The method of claim 1 wherein the step of determining further comprises determining the frames in flight.

4. The method of claim 1 wherein the eldest frame is a frame of the plurality of frames that is transmitted prior to the other frames in the plurality of frames.

5. The method of claim 1 wherein the last transmitted segment is a segment of the eldest frame that is transmitted at a time subsequent to the other segments of the eldest frame.

6. The method of claim 1 wherein the specified time period is implemented in a response timer at the transmitter.

7. The method of claim 1 wherein the transmitting the plurality of frames adheres to link layer details specified in Telecommunications Industry Association 902.

8. The method of claim 1 further comprising:
   at the receiver in the wireless communication system:
   receiving the plurality of frames in a receiver's link layer window; and
   advancing the receiver's link layer window if a received segment requires advancing the receiver's link layer window.

9. The method of claim 8 wherein advancing the receiver's link layer window occurs if the received segment has a synchronization indicator set.

10. The method of claim 8 wherein advancing the receiver's link layer window occurs if the received segment is outside the receiver's link layer window.

11. The method of claim 10 further comprising:
    determining a window size for the receiver's link layer window;
    calculating a largest frame number for the window size based upon a frame with the lowest frame number in the receiver's link layer window;
    comparing a frame number of the segment with the largest frame number; and
    determining that the segment is not within the receiver's link layer window, if the frame number of the segment is greater than the largest frame number.

12. The method of claim 8 wherein the step of advancing further comprises:
    determining the eldest frame in the receiver's link layer window;
    delivering the eldest frame to a higher layer, if the eldest frame is successfully received; and
    purging the eldest frame, if the eldest frame is not successfully received.

13. The method of claim 12 wherein the eldest frame has a lowest sequence number of the other frames in the plurality of frames.

14. The method of claim 8 wherein the receiving the plurality of frames adheres to link layer details specified in Telecommunications Industry Association 902.

15. The method of claim 8 wherein a frame is successfully received if segments associated with the frame are available in the receiver's link layer window so that the frame is complete.

16. The method of claim 1 further comprising: at the receiver in the wireless communications system:
    receiving the plurality of frames in a receiver's link layer window; determining transmitter inactivity for a specified time period; and
    delivering a first frame of the plurality of frames to a higher layer, if the first frame is successfully received.

17. The method of claim 16 further comprising purging a second frame, if the second frame is not successfully received.

18. The method of claim 17 wherein the step of determining transmitter inactivity for a specified period of time further comprises implementing a timer that is reset when receiving at least one segment of the plurality of frames.

19. The method of claim 17 further comprising advancing the receiver's link layer window if a received segment a) has the synchronization indicator set or b) is outside the receiver's link layer window.

20. The method of claim 19 wherein the step of advancing further comprises:
    determining the eldest frame in the receiver's link layer window;
    delivering the eldest frame to the higher layer, if the eldest frame is successfully received; and
    purging the eldest frame, if the eldest frame is not successfully received.

* * * * *

UNITED STATES PATENT AND TRADEMARK OFFICE
CERTIFICATE OF CORRECTION

PATENT NO. : 7,876,740 B2
APPLICATION NO. : 11/196931
DATED : January 25, 2011
INVENTOR(S) : Eastwood et al.

It is certified that error appears in the above-identified patent and that said Letters Patent is hereby corrected as shown below:

On Page 2, in Field (56), under "OTHER PUBLICATIONS", in Column 2, Line 2, delete "Techinical" and insert -- Technical --, therefor.

In Column 8, Line 51, in Claim 18, delete "claim 17" and insert -- claim 16 --, therefor.

In Column 8, Line 54, in Claim 19, delete "claim 17" and insert -- claim 16 --, therefor.

Signed and Sealed this
Thirty-first Day of July, 2012

David J. Kappos
*Director of the United States Patent and Trademark Office*